United States Patent [19]

Haslam

[11] Patent Number: 5,562,457
[45] Date of Patent: Oct. 8, 1996

[54] AID FOR TEACHING CHILDREN TO TIE SHOELACES

[76] Inventor: Shawn A. Haslam, P.O. Box 359, New Market, Ind. 47965

[21] Appl. No.: 493,135

[22] Filed: Jun. 21, 1995

[51] Int. Cl.⁶ .................................................. G09B 19/24
[52] U.S. Cl. ............................................. 434/260; 24/713
[58] Field of Search ..................................... 434/260, 258, 434/247, 433; 24/715.3, 713; D2/978

[56] References Cited

U.S. PATENT DOCUMENTS

| | | |
|---|---|---|
| 2,624,957 | 1/1953 | Collins . |
| 2,646,630 | 7/1953 | Miller . |
| 4,017,984 | 4/1977 | Bonfigli . |
| 4,721,468 | 1/1988 | Alexander et al. ...................... 434/260 |
| 4,764,119 | 8/1988 | Miraglia .................................. 434/260 |
| 4,842,522 | 1/1989 | Alexander et al. ...................... 434/260 |
| 5,209,667 | 5/1993 | Stanfield ................................. 434/260 |
| 5,372,510 | 12/1994 | Stanfield ................................. 434/260 |

*Primary Examiner*—Gene Mancene
*Assistant Examiner*—Jeffrey A. Smith
*Attorney, Agent, or Firm*—Brinks Hofer Gilson & Lione

[57] ABSTRACT

A teaching aid to assist in teaching a young child or other person how to tie his or her own shoelaces by correlating the various steps of the shoelace-tying process to a story or other logical sequence of events that the child is familiar with or can quickly learn so that an adult can readily explain the steps of the process to the child and the child can more easily understand, learn and remember the process. A teaching aid according to the present invention is a special shoelace having distinguishable segments provided thereon which are arranged in a predetermined pattern and at predetermined positions on the shoelace so as to provide a guide for describing the manner in which the shoelace is to be manipulated during the tying process.

8 Claims, 3 Drawing Sheets

AID FOR TEACHING CHILDREN TO TIE SHOELACES

BACKGROUND OF THE INVENTION

1. Field of the Invention

The present invention relates generally to a teaching aid for teaching persons how to tie bow knots; and, more particularly, to an aid for teaching young children how to tie their own shoelaces.

2. Description of the Prior Art

Many children have a great deal of difficulty in learning how to tie their own shoelaces. The difficulty is due, in large part, to the fact that the step-by-step process that must be carried out to properly tie one's shoelaces is rather complicated and hard to memorize; and is compounded by the fact that many young children lack sufficient hand and eye coordination to perform the process in an efficient manner.

Teaching a child to tie his or her own shoelaces is also difficult for many adults. Adults usually tie their own shoelaces substantially by habit giving very little thought to the details of the tying process, and many adults, therefore, have difficulty in clearly explaining the steps that must be carried out in a manner that can be readily understood by a child.

Also, many adults simply don't have the necessary time and patience that is required to properly teach a child how to perform this important and basic task.

SUMMARY OF THE INVENTION

The present invention provides a teaching aid to assist in teaching a young child or other person how to tie his or her own shoelaces by correlating the various steps of the shoelace tying process to a story or other logical sequence of events that the child is familiar with or can quickly learn, so that an adult can readily explain the steps of the process to the child and the child can more easily understand, learn and remember the process.

A teaching aid according to the present invention comprises a special shoelace having distinguishable segments or markings provided thereon which are arranged in a predetermined pattern and at predetermined positions on the shoelace so as to provide a guide for describing the manner in which the shoelace is to be manipulated during the tying process.

According to a presently preferred embodiment of the invention, the special shoelace includes a plurality of segments which are distinguishable by being of different color; and, according to a presently most preferred embodiment of the invention, the colors of the segments are selected so that the steps of tying the shoelace are correlated with a story or other logical sequence of events which is familiar to the child or which can be easily learned. For example, according to a presently most preferred embodiment, the steps of tying a shoelace are correlated with steps of forming the shoelace into an X, forming the initial crossover portion of the knot, forming an end of the shoelace into a tree having a brown trunk and green leaves, tying a yellow ribbon around the tree trunk, and pulling a well-known character such as a rabbit through the hole formed by the ribbon to complete the forming of the bow knot.

The character is preferably provided on a gripping member, such as a small tab, which is integral with and extends from the shoelace at the appropriate location to provide a convenient means that can be readily grasped by the child to assist in forming the final bow knot. Alternatively, the character can be provided on a surface of the shoelace itself or be on a member attached to the shoelace after it is installed on the shoe.

In general, the present invention provides a teaching aid that will greatly assist parents, teachers and other adults in teaching children how to tie their own shoelaces; and, at the same time, provides a learning aid to help children more quickly learn the shoelace-tying process.

Yet further advantages and specific details of the invention will become apparent hereinafter in conjunction with the following detailed description of a presently preferred embodiment.

DETAILED DESCRIPTION OF A PREFERRED EMBODIMENT

Figure 1:
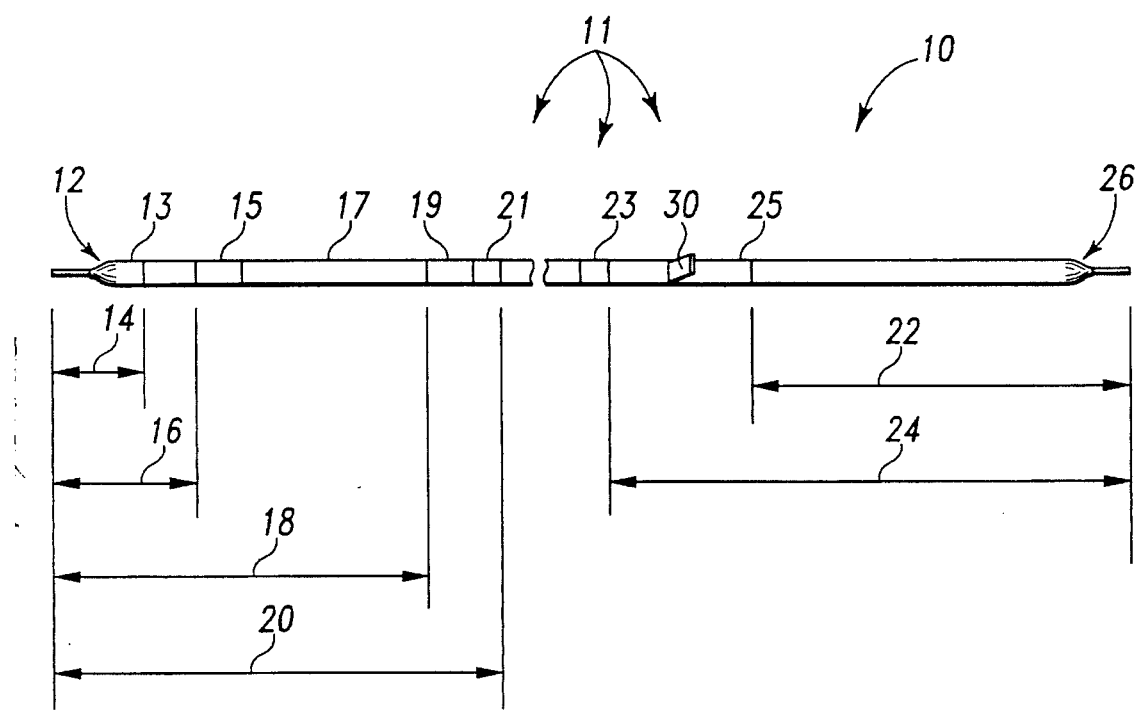
FIG. 1 is a plan view of a teaching aid according to a presently preferred embodiment of the invention.

FIG. 1 illustrates a teaching aid to assist in teaching young children or other persons how to tie their own shoelaces according to a presently preferred embodiment of the invention. The teaching aid is designated by reference number 10, and comprises a special shoelace having a plurality of distinguishable segments, generally designated by reference number 11, which are arranged in a predetermined pattern and at predetermined locations on the shoelace.

In a presently preferred embodiment of the invention, the segments 11 are distinguished from one another by being of different color; and in the presently most preferred embodiment, illustrated in FIG. 1, the distinguishable segments include segments of different colors which are selected such that the steps of tying one's shoelaces can be correlated to a story or other logical sequence of events that the child is familiar with or can easily learn.

More particularly, as shown in FIG. 1, the special shoelace 10 includes a first black segment 13 which extends from a first end 12 of the shoelace by a first distance 14. A second segment 15 is brown and starts at a second distance 16 from the end 12 and extends for a distance of approximately one inch. A third segment 17 is green and begins adjacent the second segment 15 and extends for a third distance 18 from the end 12. A second brown segment 19 begins adjacent the third segment 17 and extends for a distance of approximately one inch. Finally, a second black segment 21 extends from adjacent the second brown segment 19 to a distance 20 from the end 12.

A yellow segment 25 begins at a distance 22 from the end 26 of shoelace 10 and extends to a distance 24 from the end 26. A red segment 23 begins adjacent the yellow segment 25 at distance 24 and extends for a distance of approximately one-half inch. The remainder of the shoelace 10, other than the colored segment portions, is preferably white or of some other non-distinct color.

The various distances 14, 16, 18, 20, 22 and 24 will vary somewhat depending on the particular length of the special shoelace 10; and, the following table provides approximate distances for various standard shoelace lengths.

| Shoelace Length (inches) | Reference No. (Distance from ends 12 or 26 of shoelace (inches). | | | | | |
|---|---|---|---|---|---|---|
| | 14 | 16 | 18 | 20 | 22 | 24 |
| 27 | 1 | 2 | 6½ | 8 | 4 | 6½ |
| 36 | 1¼ | 2¼ | 7 | 8½ | 8 | 10¼ |
| 40 | 1 | 2 | 7½ | 9 | 7 | 10 |
| 45 | 1½ | 3 | 9 | 10½ | 8½ | 11½ |

Also shown in FIG. 1 is a small tab 30 which is integrally formed on or attached to the shoelace 10 at the location of the yellow segment 25. Tab 30 extends outwardly from the shoelace 10 by a short distance, for example, one-fourth of an inch, and functions as a gripping member to assist the child in gripping the shoelace at the proper location during the tying process as will be explained hereinafter. As will also be explained hereinafter, tab 30 preferably includes a picture of a rabbit or other animal or item of interest to a child.

In the preferred embodiment described herein, gripping member 30 comprises a tab which is sewn onto shoelace 10 and is formed of a material which may be the same as that of the shoelace, and which is sufficiently soft and deformable so as to be capable of being threaded through the eyelets of a shoe when the shoelace is being installed on the shoe. Alternatively, however, gripping member 30 could take various other forms. For example, the gripping member could comprise a member which is adapted to be attached to the shoelace at the proper location after the shoelace is installed on the shoe; or, alternatively, it may simply comprise a picture or other image provided directly on a surface of the shoelace.

The manner in which special shoelace 10 of the present invention is utilized in teaching a child how to tie his or her own shoelaces will now be explained with reference to FIGS. 2–7.

Initially, it is assumed that the shoelace 10 has already been installed on a shoe (designated by reference number 40) by being threaded through the eyelets 41 thereof in the normal manner. When installed, the colored segments thereon will all be on the portions of the shoelace that extend from the last eyelet on the shoe so that they may be usable in conjunction with the shoelace typing process. The child may then either put on the shoe or the shoe may be placed in front of the child with the toe of the shoe facing outwardly and away from the child.

Figure 2:
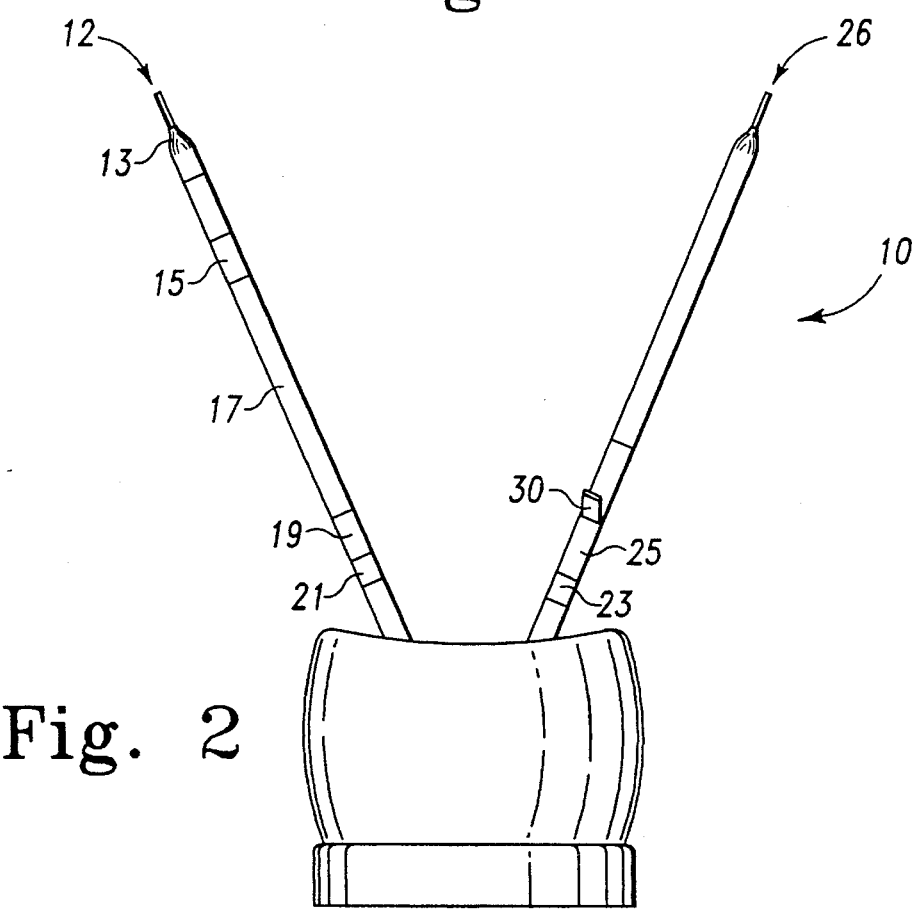
FIG. 2 is a rear view of a shoe having the teaching aid of FIG. 1 installed therein to illustrate the initial position of the teaching aid.

If the child is right-handed, it is preferable that the shoelace 10 be installed on the shoe such that the end 12 is on the left side of the shoe and the end 26 is on the right side of the shoe when the toe of the shoe is facing outwardly and away from the child as shown in FIG. 2. If the child is left-handed, the shoelace should be reversed from the orientation shown in FIG. 2.

Figure 3:
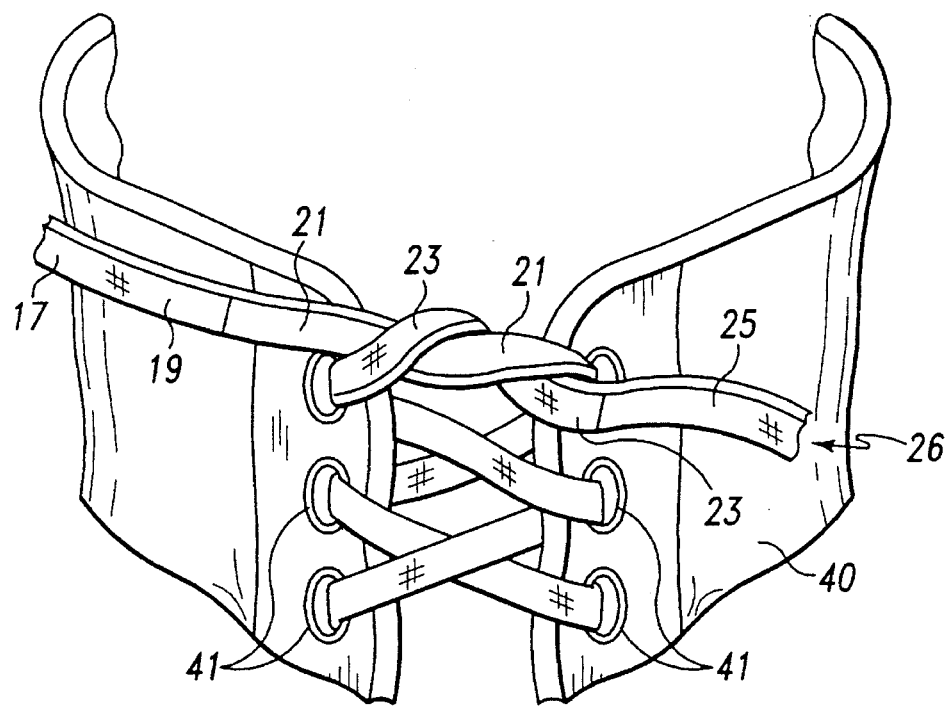
FIGS. 3–7 illustrate the step-by-step process of tying a shoelace utilizing the teaching aid of FIG. 1.

As the first step in the tying process, the child is instructed to take the right end 12 of the shoelace and move it across the shoe so as to position the second black segment 21 thereon over the red segment 23 on the left end of the shoelace so as to form the shoelace into an "X." (Note that in FIGS. 3–7, the front of the shoe is shown to facilitate illustration of the tying process.) The child is then instructed to take the first black segment 13 and to run it under the X and to pull tightly to make the initial crossover of the first knot as shown in FIG. 3.

Figure 4:
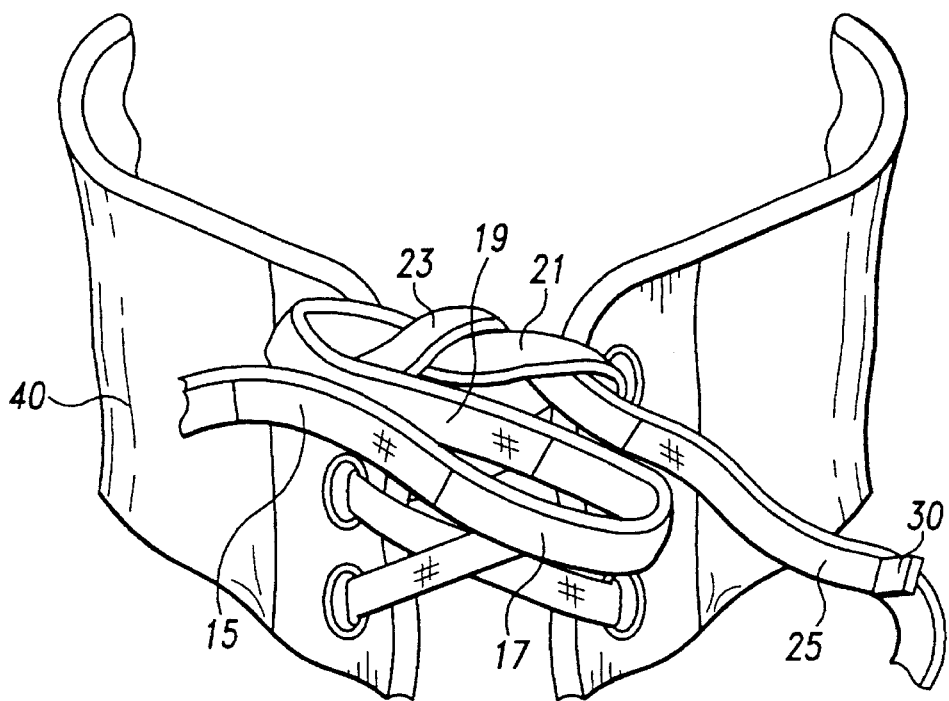

After the step of forming the first knot, the child is then instructed to form a loop in the first end of the shoelace by placing the first brown segment 15 against the second brown segment 19 to thus form a loop in the green segment 17 as shown in FIG. 4. To assist the child in remembering this step, he is advised that he is forming a "tree" having a "brown trunk" defined by the two brown segments and "green leaves" defined by the looped green segment.

Figure 5:
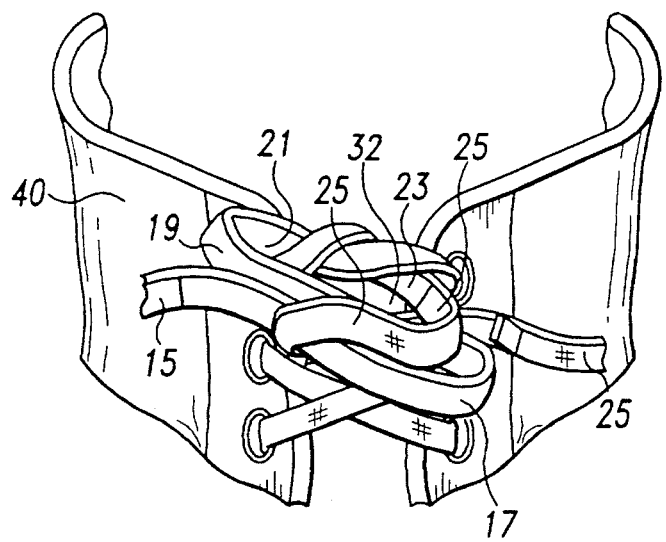
Figure 6:
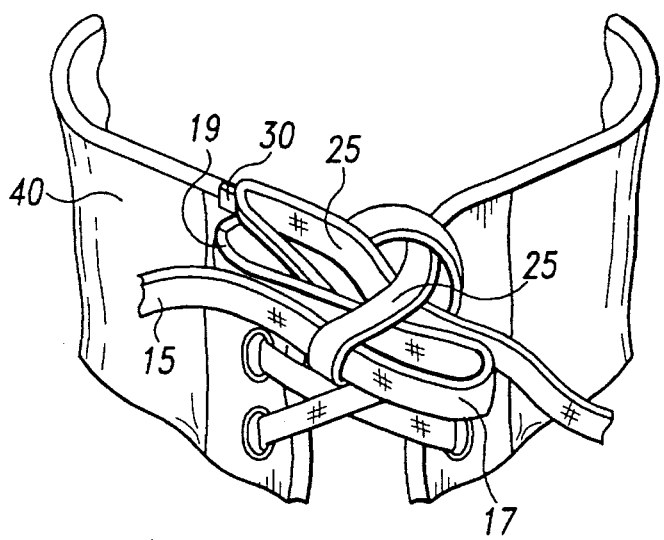

The second end of the shoelace is then pulled around the "brown tree trunk" formed in the first end of the shoelace as shown in FIG. 5 so that the yellow portion 25 forms a loop around the brown tree trunk portions as shown in FIG. 5. The child is told that he is forming a "yellow ribbon" around the tree trunk. The child is then instructed to reach through the hole formed by the yellow ribbon at 32 in FIG. 5 and to grab the "rabbit" 30 and to pull the rabbit through the hole as shown in FIG. 6.

Figure 7:
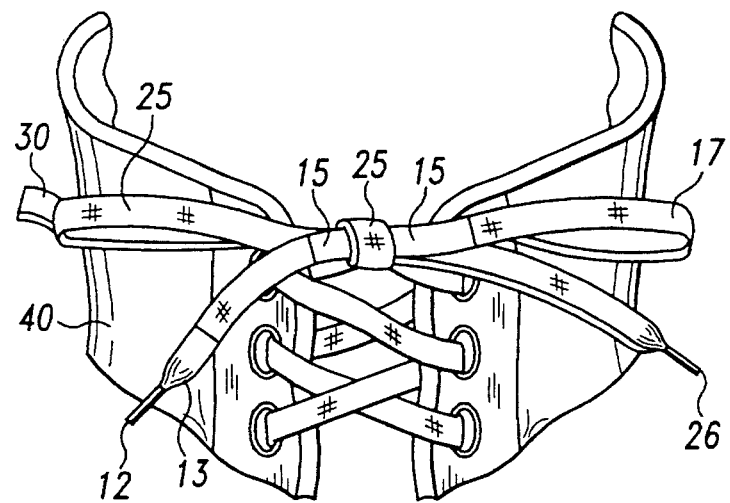

Once the rabbit 30 has been pulled through the hole, the rabbit 30 and the green leaves 17 from the tree are then pulled away from each other to form the final bow knot shown in FIG. 7.

With the invention according to the presently preferred embodiment described above, a child is taught how to tie his own shoelaces by, essentially, following the steps of forming an X, forming a tree, tying a yellow ribbon around the trunk of the tree, pulling a rabbit through the yellow ribbon and pulling the rabbit and the leaves of the tree apart. Because of the correlation of the steps of the shoelace-tying process with a story or other logical sequence of events, the child will very quickly learn and remember how to tie his or her shoelaces.

Although, as described above, the particular colors selected in the presently preferred embodiment correlate the shoe-tying process to a story about tying a yellow ribbon around the old oak tree, it should be recognized that the colors can be changed as desired to support any number of stories or concepts without departing from the scope of the present invention. It should also be understood that although colors are used in the preferred embodiment as the distinguishing features of the segments on the shoelace, other distinguishing means can be used such as different patterns or the like. Also, the "rabbit" could be any other animal or object that would fit within the story or concept being used to explain the process.

Finally, it should be recognized that although the present invention has been described primarily as an aid to assist in teaching a child to tie shoelaces, the invention could also be practiced in teaching children to tie bow knots in other objects, for example, ribbons, string or the like. Also, the invention could be utilized in teaching adults with certain learning disabilities how to tie their own shoelaces.

Although the invention has been described with reference to a particularly preferred embodiment, it should be recognized that numerous modifications and variations can be made to the invention without departing from the scope and spirit thereof. Therefore, it should be recognized that the invention should be limited only insofar as is required by the scope of the following claims.

I claim:

1. A teaching aid for teaching a person how to tie a shoelace, the teaching aid comprising:

a special shoelace having a plurality of colored segments arranged thereon in a predetermined pattern and at predetermined locations along the length thereof, the colors of the colored segments being selected such that a step-by-step process of tying a shoelace is correlated to a predetermined sequence of events; and a gripping member on said shoelace at a selected location thereon to assist said person in performing a step of said step-by-step process of reaching through a hole formed in a loop of said shoelace, gripping said gripping member and pulling said shoelace through the hole.

2. The teaching aid of claim 1 wherein said gripping member includes a member which extends outwardly from said shoelace.

3. The teaching aid of claim 2 wherein said gripping member extends from a selected one of said plurality of colored segments.

4. The teaching aid of claim 2 wherein the gripping member comprises a tab integral with and extending from the shoelace.

5. The teaching aid of claim 4 wherein said tab is sufficiently deformable so as to be able to be threaded through eyelets on a shoe.

6. The teaching aid of claim 1 wherein the plurality of colored segments includes a pair of colored segments that cooperate with each other to provide a guide for forming an initial crossover portion of the knot.

7. The teaching aid of claim 1 wherein the colors of the plurality of colored segments are selected to correlate the shoelace-tying process to a story of tying a yellow ribbon around an old oak tree.

8. The teaching aid of claim 1 wherein the lengths and locations of said plurality of colored segments are selected as a function of shoelace length.

* * * * *